US009586321B2

(12) United States Patent
Maruyama

(10) Patent No.: US 9,586,321 B2
(45) Date of Patent: Mar. 7, 2017

(54) ROBOT, CONTROL METHOD OF ROBOT, AND CONTROL DEVICE OF ROBOT

(71) Applicant: Seiko Epson Corporation, Tokyo (JP)

(72) Inventor: Kenichi Maruyama, Tatsuno (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/725,421

(22) Filed: May 29, 2015

(65) Prior Publication Data

US 2015/0343641 A1    Dec. 3, 2015

(30) Foreign Application Priority Data

Jun. 2, 2014  (JP) .................................. 2014-113819
Feb. 25, 2015  (JP) .................................. 2015-034917

(51) Int. Cl.

| G05B 19/00 | (2006.01) |
|---|---|
| B25J 9/16 | (2006.01) |
| B25J 19/02 | (2006.01) |
| B25J 9/00 | (2006.01) |
| B25J 13/08 | (2006.01) |

(52) U.S. Cl.
CPC ........... *B25J 9/1697* (2013.01); *B25J 9/0087* (2013.01); *B25J 13/085* (2013.01); *B25J 19/023* (2013.01); *G05B 2219/37555* (2013.01); *G05B 2219/39109* (2013.01); *G05B 2219/40607* (2013.01); *Y10S 901/01* (2013.01); *Y10S 901/02* (2013.01); *Y10S 901/47* (2013.01)

(58) Field of Classification Search
CPC combination set(s) only.
See application file for complete search history.

(56) References Cited

U.S. PATENT DOCUMENTS

| 4,187,051 A * | 2/1980 | Kirsch ..................... B25J 9/041 |
|---|---|---|
| | | 318/640 |
| 4,613,269 A * | 9/1986 | Wilder ................... B25J 9/1697 |
| | | 348/92 |
| 5,499,306 A * | 3/1996 | Sasaki .................... B25J 9/1697 |
| | | 382/153 |
| 6,115,650 A * | 9/2000 | Demarest ......... A61B 17/06004 |
| | | 700/245 |
| 7,244,093 B2 * | 7/2007 | Watanabe .............. B25J 9/1697 |
| | | 198/395 |
| 9,050,719 B2 * | 6/2015 | Valpola .................. B25J 9/1694 |
| 9,155,592 B2 * | 10/2015 | Itkowitz ............. A61B 19/2203 |
| 2002/0039183 A1 * | 4/2002 | Yagita ................ G01N 21/9027 |
| | | 356/240.1 |

(Continued)

FOREIGN PATENT DOCUMENTS

| JP | 61-090205 A | 5/1986 |
|---|---|---|
| JP | 64-027885 A | 1/1989 |

(Continued)

*Primary Examiner* — Jonathan L Sample
(74) *Attorney, Agent, or Firm* — Harness, Dickey & Pierce, P.L.C.

(57) ABSTRACT

A robot includes a grasping unit and performs an action based on: first imaging information of the grasping unit which does not grasp an object to be grasped in a first point; second imaging information of the grasping unit which does not grasp the object to be grasped in a second point which is different from the first point; and third imaging information of the object to be grasped which is grasped by the grasping unit in the first point.

8 Claims, 10 Drawing Sheets

(56) References Cited

U.S. PATENT DOCUMENTS

| | | | | |
|---|---|---|---|---|
| 2004/0266276 | A1* | 12/2004 | Hariki | B25J 9/1697 439/894 |
| 2006/0184272 | A1* | 8/2006 | Okazaki | B25J 9/1697 700/245 |
| 2008/0027582 | A1* | 1/2008 | Obinata | B25J 13/082 700/260 |
| 2008/0247844 | A1* | 10/2008 | Hartrampf | B21J 15/043 414/4 |
| 2010/0004778 | A1* | 1/2010 | Arimatsu | B25J 9/1697 700/214 |
| 2010/0036393 | A1* | 2/2010 | Unsworth | A61B 90/06 606/130 |
| 2011/0153076 | A1 | 6/2011 | Noro | |
| 2011/0208355 | A1* | 8/2011 | Tsusaka | B25J 9/1664 700/246 |
| 2012/0004774 | A1* | 1/2012 | Umetsu | B25J 15/0009 700/254 |
| 2012/0059517 | A1* | 3/2012 | Nomura | B25J 9/1612 700/259 |
| 2012/0165986 | A1* | 6/2012 | Fuhlbrigge | B25J 9/1687 700/259 |
| 2013/0158710 | A1* | 6/2013 | Oda | B25J 9/1697 700/259 |
| 2013/0238124 | A1* | 9/2013 | Suzuki | B25J 9/16 700/250 |
| 2014/0012416 | A1* | 1/2014 | Negishi | B25J 9/1607 700/251 |
| 2014/0288710 | A1 | 9/2014 | Ikenaga et al. | |
| 2014/0309762 | A1* | 10/2014 | Hayata | B25J 9/1682 700/114 |
| 2015/0217451 | A1* | 8/2015 | Harada | B25J 9/1612 700/253 |
| 2015/0343641 | A1* | 12/2015 | Maruyama | B25J 9/1697 700/259 |

FOREIGN PATENT DOCUMENTS

| | | |
|---|---|---|
| JP | 10-340112 | 12/1998 |
| JP | 2004-082232 A | 3/2004 |
| JP | 2006-082171 A | 3/2006 |
| JP | 2011-131300 A | 7/2011 |
| JP | 2011-224695 A | 11/2011 |
| JP | 2014-180720 A | 9/2014 |

* cited by examiner

ROBOT, CONTROL METHOD OF ROBOT, AND CONTROL DEVICE OF ROBOT

BACKGROUND

1. Technical Field

The present invention relates to a robot, a control method of a robot, and a control device of a robot.

2. Related Art

If a position and a posture of a grasped object deviate from an expected position and posture, when a robot performs an assembly operation, the assembly operation may be affected negatively, in many cases. In a unit which detects the deviation, it is effective to image the grasped object by an imaging unit and calculate a relationship in position and postures between a grasping unit and the object to be grasped, however, the deviations in a coordinate system of the robot and a coordinate system of the imaging unit as a reference are different from each other depending on a place, and accordingly, the deviated amounts are not uniform, and the expected accuracy is difficult to obtain with one kind of correction amount. Therefore, the position and the posture may be slightly deviated even after grasping of the object to be grasped, and the grasped object may not be assembled.

For example, there is disclosed a tool position correction method of an articulated robot of storing a position deviation amount in the database and using the value when performing the action (for example, see JP-A-2006-82171).

However, in the tool position correction method disclosed in JP-A-2006-82171, the grasping unit is visible from the imaging unit when measuring the position deviation amount, but this state may not be realized in a case of the arrangement of an imaging unit of a double arm robot, or the like.

SUMMARY

An advantage of some aspects of the invention is to solve at least a part of the problems described above, and the invention can be implemented as the following forms or application examples.

Application Example 1

This application example is directed to a robot including a grasping unit, in which the robot performs an action based on: first imaging information of the grasping unit which does not grasp an object to be grasped in a first point; second imaging information of the grasping unit which does not grasp the object to be grasped in a second point which is different from the first point; and third imaging information of the object to be grasped which is grasped by the grasping unit in the first point.

According to this application example, since the relationship between the grasping unit and the object to be grasped by the grasping unit is calculated based on each imaging information item at the positions of the first point (for example, check position) and the second point (for example, target position), it is possible to decrease the deviation (of the target position) at the time of assembly. Therefore, it is possible to provide a robot which realizes assembly with high accuracy.

Application Example 2

In the robot according to the application example described above, it is preferable that the first imaging information, the second imaging information, and the third imaging information are position and posture information items.

According to this application example, since each imaging information is the position and the posture information, it is possible to easily check the position and the posture of the grasping unit and the object to be grasped.

Application Example 3

In the robot according to the application example described above, it is preferable that the robot further includes a fourth control unit which compares the first imaging information, the second imaging information, and the third imaging information with each expected value which is previously set, and calculates each correction amount for correcting a deviation amount according to the results of the comparison.

According to this application example, since each imaging information item is corrected at the positions of the first point and the second point, it is possible to decrease the deviation at the time of assembly.

Application Example 4

In the robot according to the application example described above, it is preferable that the robot further includes an imaging unit, the grasping unit includes a plurality of claw portions each including a distal portion which is disposed in a first direction and a second direction and grasps the object to be grasped, and a proximal portion which is positioned in a third direction orthogonal to the first direction and the second direction with respect to the distal portion, and the posture of the grasping unit to be imaged by the imaging unit in the first point is that the imaging unit is positioned in the third direction on the distal portion side of the claw portion.

According to this application example, it is possible to expose a rear surface (surface not overlapping the grasping unit and the claw portion) of the object to be grasped in the imaging direction of the imaging unit. Accordingly, there is no shielding between the imaging unit and the object to be grasped, and the object to be grasped is rarely screened by the grasping unit. As a result, it is possible to image the outline shape of the rear side of the object to be grasped.

Application Example 5

In the robot according to the application example described above, it is preferable that a plurality of the imaging units are provided.

According to this application example, since the plurality of imaging units are provided, it is possible to increase resolution of the image obtained by the imaging unit and it is possible to create an image having excellent accuracy. Accordingly, it is possible to obtain the position and the posture having high positional accuracy.

Application Example 6

In the robot according to the application example described above, it is preferable that the imaging unit is a stereo camera.

According to this application example, there is no shielding between the imaging unit and the object to be grasped, and the object to be grasped is rarely screened by the grasping unit.

Application Example 7

In the robot according to the application example described above, it is preferable that the second imaging information uses the shape of the grasping unit or an image of a marker provided on the grasping unit.

According to this application example, it is possible to easily perform the calculation of the second imaging information.

Application Example 8

This application example is directed to a control method of a robot which includes a grasping unit, including controlling the robot based on: first imaging information of the grasping unit which does not grasp an object to be grasped in a first point; second imaging information of the grasping unit which does not grasp the object to be grasped in a second point which is different from the first point; and third imaging information of the object to be grasped which is grasped by the grasping unit in the first point.

According to this application example, since the relationship between the grasping unit and the object to be grasped which is grasped by the grasping unit is calculated based on each imaging information item in the positions of the first point and the second point, it is possible to decrease the deviation at the time of assembly. Accordingly, it is possible to provide a control method of a robot which controls a robot which realizes assembly with a high accuracy.

Application Example 9

In the control method of a robot according to the application example described above, it is preferable that the control method further includes comparing the first imaging information, the second imaging information, and the third imaging information with each expected value which is previously set, and calculating each correction amount for correcting a deviation amount according to the results of the comparison.

According to this application example, since each imaging information item is corrected in the positions of the first point and the second point, it is possible to decrease the deviation at the time of assembly.

Application Example 10

This application example is directed to a control device of a robot which controls a robot including a grasping unit based on: first imaging information of the grasping unit which does not grasp an object to be grasped in a first point; second imaging information of the grasping unit which does not grasp the object to be grasped in a second point which is different from the first point; and third imaging information of the object to be grasped which is grasped by the grasping unit in the first point.

According to this application example, since the relationship between the grasping unit and the object to be grasped which is grasped by the grasping unit is calculated based on each imaging information item in the positions of the first point and the second point, it is possible to decrease the deviation at the time of assembly. Accordingly, it is possible to provide a control method of a robot which controls a robot which realizes assembly with a high accuracy.

Application Example 11

In the control device of a robot according to the application example described above, it is preferable that the control device further includes a fourth control unit which compares the first imaging information, the second imaging information, and the third imaging information with each expected value which is previously set, and calculates each correction amount for correcting a deviation amount according to the results of the comparison.

According to this application example, since each imaging information item is corrected in the positions of the first point and the second point, it is possible to decrease the deviation at the time of assembly.

BRIEF DESCRIPTION OF THE DRAWINGS

The invention will be described with reference to the accompanying drawings, wherein like numbers reference like elements.

FIGS. 10A and 10B are diagrams showing position and postures of a hand according to the first embodiment, in which FIG. 10A is a diagram showing a target position of a hand and FIG. 10B is a diagram showing correction of a position and a posture of a hand.

DESCRIPTION OF EXEMPLARY EMBODIMENTS

First Embodiment

Hereinafter, specific embodiments of the invention will be described with reference to the drawings. The drawings used herein show suitably enlarged or contracted illustrated parts, so that the illustrated parts can be recognized.

Figure 1:
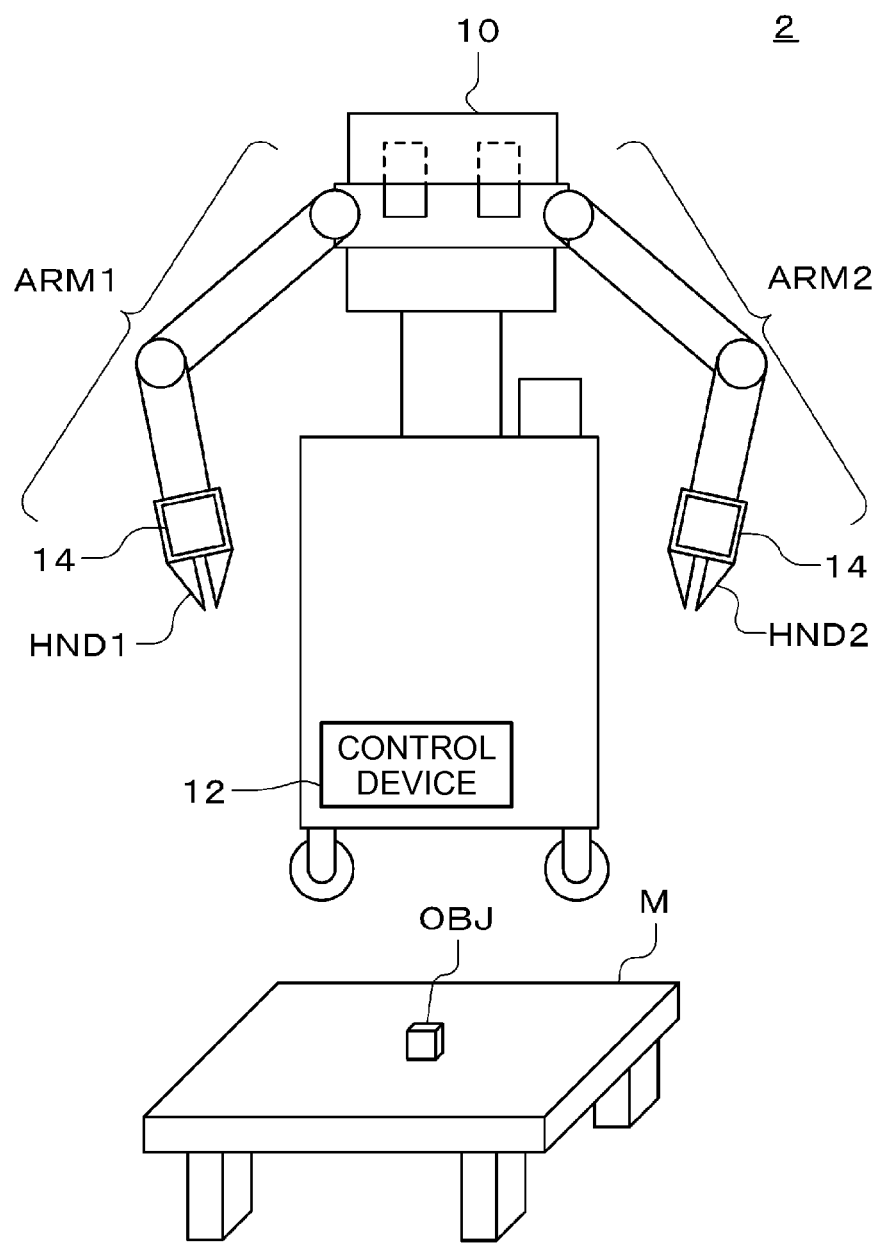
FIG. 1 is a diagram showing an example of a usage situation of a robot according to a first embodiment.

FIG. 1 is a diagram showing an example of a usage situation of a robot according to the embodiment.

A robot 2 according to the embodiment includes a camera (imaging unit) 10 and a control device 12. The imaging unit 10 is mounted on the robot 2. The camera 10 images a grasped object OBJ (object to be grasped) (see FIG. 7). The camera 10 performs the imaging as a position and a posture of the object OBJ grasped by a hand (grasping unit) HND1 are changed.

A plurality of cameras 10 may be provided. According to this, by providing the plurality of cameras 10, it is possible to increase resolution of an image acquired by the cameras 10 and to create an image having an excellent accuracy. Accordingly, it is possible to obtain a position and a posture (three-dimensional position and posture) having a high positional accuracy.

The camera 10 is, for example, a camera including a charge-coupled device (CCD) or a complementary metal oxide semiconductor (CMOS) which is an imaging device converting condensed light into an electric signal. The camera 10 is, for example, a stereo camera configured with two cameras, but may be configured with three or more cameras, or may image a two-dimensional image with one camera. The camera is a movable type and is movable vertically and horizontally. According to this, there is no shielding between the camera 10 and the object OBJ and the object OBJ is rarely screened by the hand HND1.

The camera 10 is, for example, connected to the control device 12 through a cable to communicate with the control device. The wired communication through the cable is performed based on standards such as Ethernet (registered trademark) or universal serial bus (USB), for example. The camera 10 and the control device 12 may be connected to each other through wireless communication performed based on communication standards such as Wi-Fi (registered trademark). The object OBJ is previously installed on an installation surface M. The "installation surface M" is, for example, a surface on a table. The camera 10 is installed at a position so as to image the object OBJ. The camera 10 images the object OBJ and the captured image of the imaged object OBJ is output to the communication device 12 through communication.

As shown in FIG. 1, the robot 2 is, for example, a double arm robot including the hand HND1, a hand HND2, force sensors 14, an arm portion ARM1, an arm portion ARM2, and a plurality of actuators (not shown), on right and left arms which are base shafts of the robot. Each of the base shafts of the robot includes a rotation shaft and rotates. Each arm of the robot 2 is a six-axial vertical articulated type. A support table, the arm portion ARM1, and the grasping unit HND1 of one arm can perform an action having degrees of freedom in six axes by a joint action by the actuators, and a support table, the arm portion ARM2, and the hand HND2 of the other arm can perform an action having a degree of freedom with six axes by a joint action by the actuators. Each arm of the robot 2 may perform an action with five or less degrees of freedom (five axes) or may perform an action with seven or more degrees of freedom (seven axes). Hereinafter, the action of the robot 2 performed by the arm including the hand HND1 and the arm portion ARM1 will be described, but the same action may be performed by the arm including the hand HND2 and the arm portion ARM2. The hand HND1 grasps the object OBJ. The "hand HND1" is an example of the "grasping unit" in the appended claims. The robot 2 is, for example, connected to the control device 12 through a cable to communicate with the control device. The wired communication through the cable is performed based on standards such as Ethernet (registered trademark) or USB, for example. The robot 2 and the control device 12 may be connected to each other through wireless communication performed based on communication standards such as Wi-Fi (registered trademark). The robot 2 shown in FIG. 1 is a double arm robot, but may be realized as a single arm robot.

Figure 4:
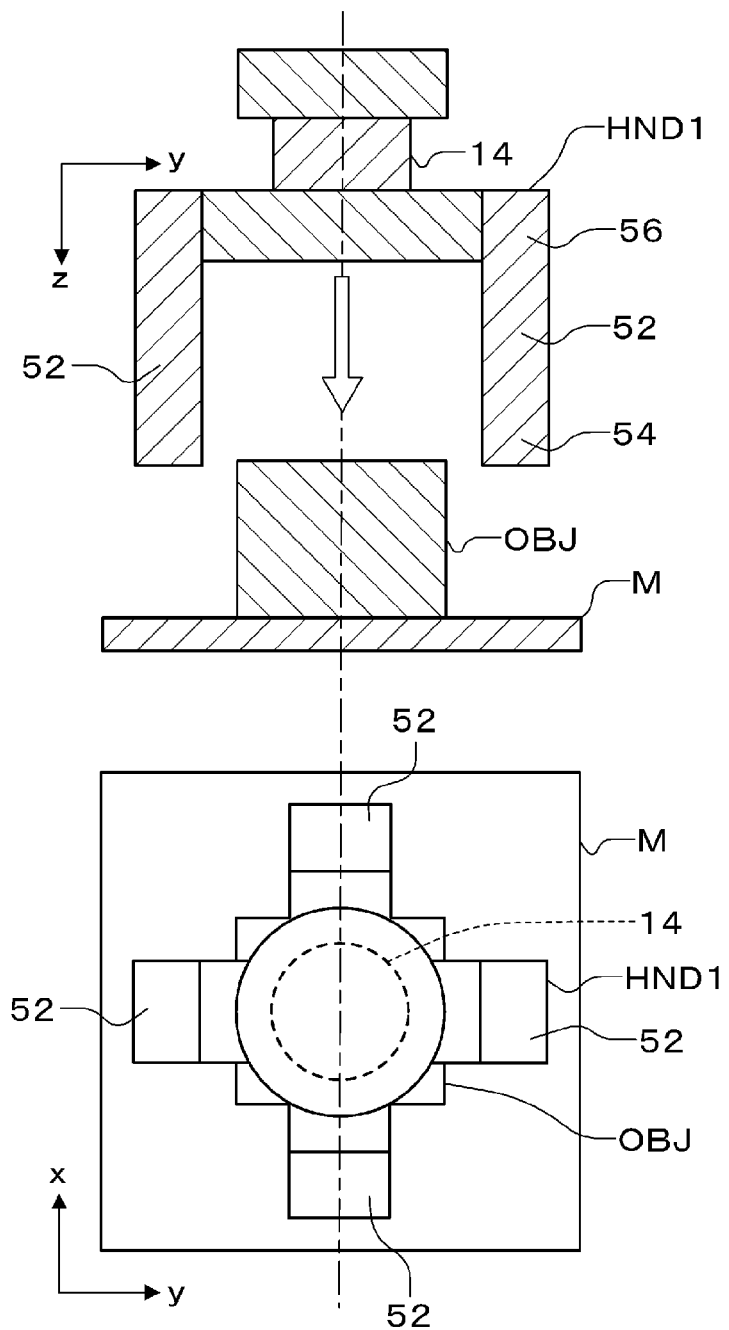
FIG. 4 is a diagram illustrating an example of a grasping method of an object with a hand according to the first embodiment.

The hand HND1 of the robot 2 includes claw portions 52 which can grasp or clamp the object OBJ (see FIG. 4). A force sensor 14 is provided between the hand HND1 and the arm portion ARM1 of the robot 2 and detects a force or a moment operating on the hand HND1. The force sensor 14 outputs information regarding the detected force or moment to the control device 12 through the communication. The information regarding the force or moment detected by the force sensor 14 is, for example, used in impedance control of the robot 2 by the robot control unit 16.

The robot 2 acquires a control signal based on the three-dimensional position and posture of the object OBJ from the control device 12 and performs a predetermined operation for the object OBJ based on the acquired control signal. The predetermined operation is, for example, an operation of grasping the object BOJ by the hand HND1 of the robot 2 and moving the grasped object OBJ from the current position to another position or assembling the object into another device after the movement.

The camera 10 may be installed at a portion other than the hand HND1 which grasps the object OBJ. According to this, it is possible to avoid a situation where only a partial shape of the object OBJ can be imaged due to the positional relationship between the object OBJ and the camera 10 approaching each other, when the object OBJ is grasped.

The control device 12 performs image processing of the image captured by the camera 10. The control device 12 calculates the position and the posture of the object OBJ. The control device 12 performs control such that the robot 2 performs a predetermined operation. More specifically, the control device 12 calculates the three-dimensional position and the posture of the object OBJ based on the captured image of the object OBJ imaged by the camera 10. The control device 12 causes the robot 2 to grasp the object OBJ by the hand HND1, based on the calculated three-dimensional position and the posture of the object OBJ. After that, the control device 12 controls the robot 2 so that the robot performs a predetermined operation with respect to the grasped object OBJ.

Next, the hardware configuration of the control device 12 will be described with reference to FIG. 2.

Figure 2:
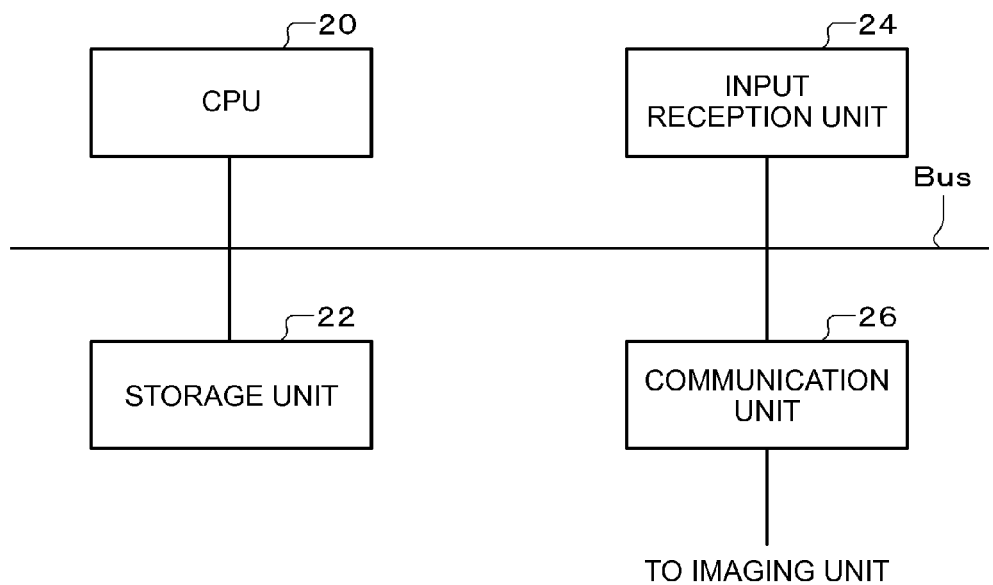
FIG. 2 is a diagram showing an example of a hardware configuration of a control device according to the first embodiment.

FIG. 2 is a diagram showing an example of the hardware configuration of the control device 12 according to the embodiment. The control device 12, for example, includes a central processing unit (CPU) 20, a storage unit 22, an input reception unit 24, and a communication unit 26, and communicates with the camera 10 or the like through the communication unit 26. The constituent elements are connected to each other through a bus so as to communicate with each other. The CPU 20 executes various programs stored in the storage unit 22. The storage unit 22, for example, includes a hard disk drive (HDD) or solid state drive (SSD), an electrically erasable programmable read-only memory (EEPROM), a read-only memory (ROM), a random access memory (RAM), or the like, and stores various information items or images and programs to be processed by the control device 12. The storage unit 22 may be an external storage device connected by a digital input and output port of the USB or the like, instead of the unit built into the control device 12.

The input reception unit 24 is, for example, a keyboard or a mouse, a touch pad, and other input devices. The input reception unit 24 may function as a display unit and may be configured as a touch panel. The communication unit 26 is, for example, configured to include a digital input and output port of the USB or Ethernet (registered trademark) port.

Next, the functional configuration of the control device 12 will be described with reference to FIG. 3.

Figure 3:
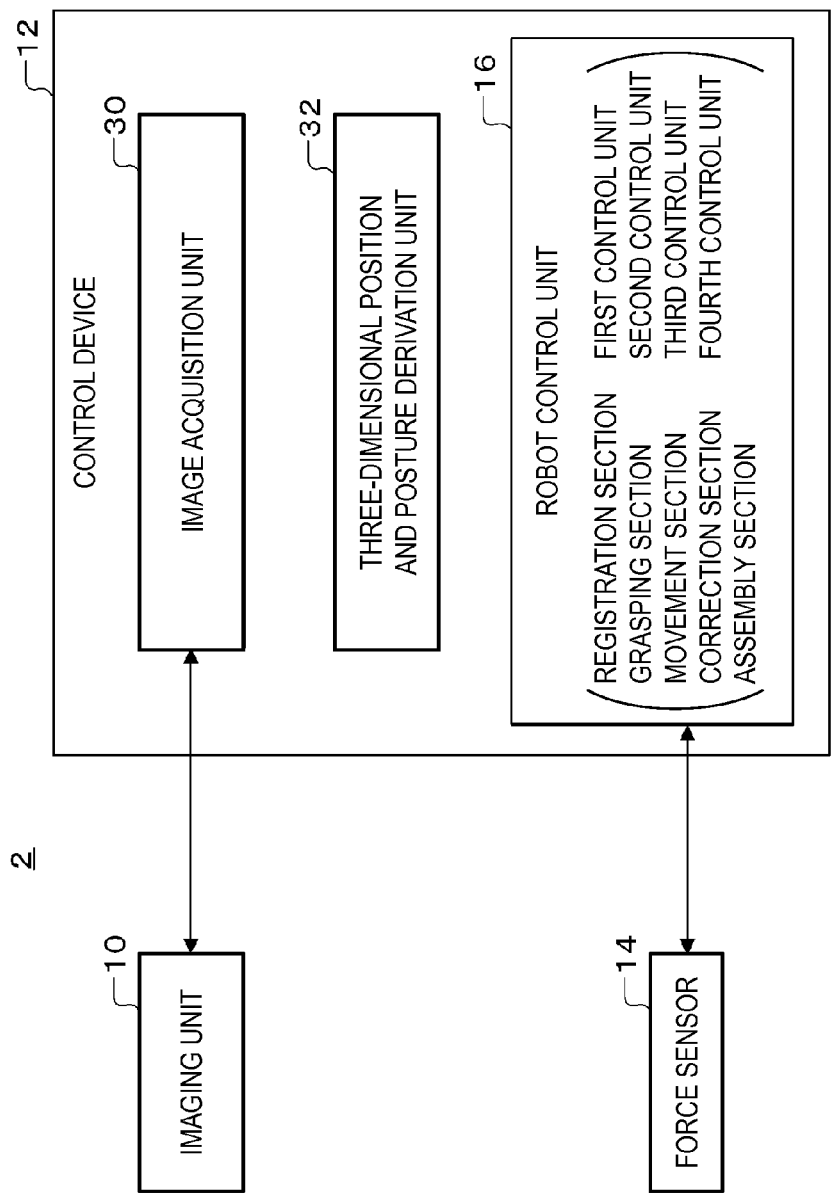
FIG. 3 is a diagram showing an example of a functional configuration of the control device according to the first embodiment.

FIG. 3 is a diagram showing an example of the functional configuration of the control device 12 according to the embodiment. The control device 12, for example, includes an image acquisition unit 30, a three-dimensional position and posture derivation unit 32, and the robot control unit 16. Some or all of the functional units are realized by executing various programs stored in the storage unit 22 by the CPU 20, for example. Some or all of the functional units may be hardware functional units such as the large scale integration (LSI) or an application specific integrated circuit (ASIC).

The image acquisition unit 30 acquires the image captured by the camera 10 and outputs the acquired captured image to the three-dimensional position and posture derivation unit 32. The image acquisition unit 30 stores the acquired captured image in the storage unit 22, and the three-dimensional position and posture derivation unit 32 may read the captured image from the storage unit 22. The three-dimensional position and posture derivation unit 32 derives the three-dimensional position and posture of the object OBJ based on the captured image acquired from the image acquisition unit 30. The three-dimensional position and posture derivation unit 32 outputs the derived three-dimensional position and the posture of the object OBJ to the robot control unit 16.

The robot control unit 16 controls the robot 2 so as to cause the robot 2 to grasp the object OBJ by the hand HND1, based on the three-dimensional position and the posture of the object OBJ acquired from the three-dimensional position and posture derivation unit 32.

The robot control unit 16 includes a registration section, a grasping section, a movement section, a correction section, and an assembly section.

Figure 10A:
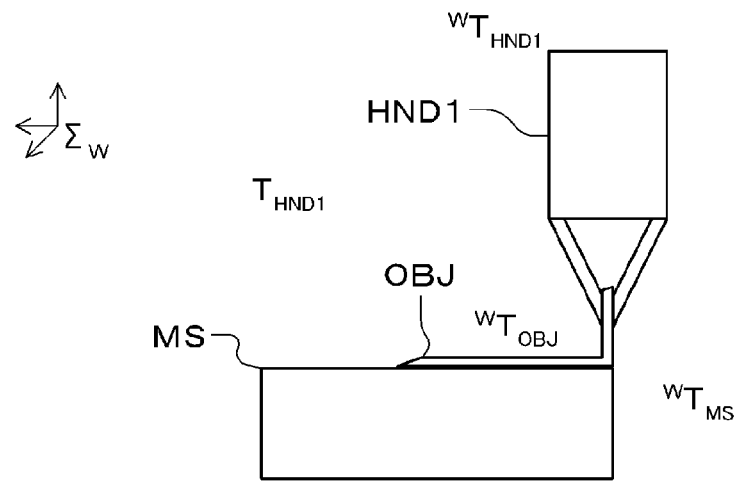

The registration section registers a target position of the hand HND1 so that the object OBJ has the position and the posture to be assembled on an assembly surface MS (see FIG. 10A).

The grasping section grasps the object OBJ by the hand HND1.

Figure 11:
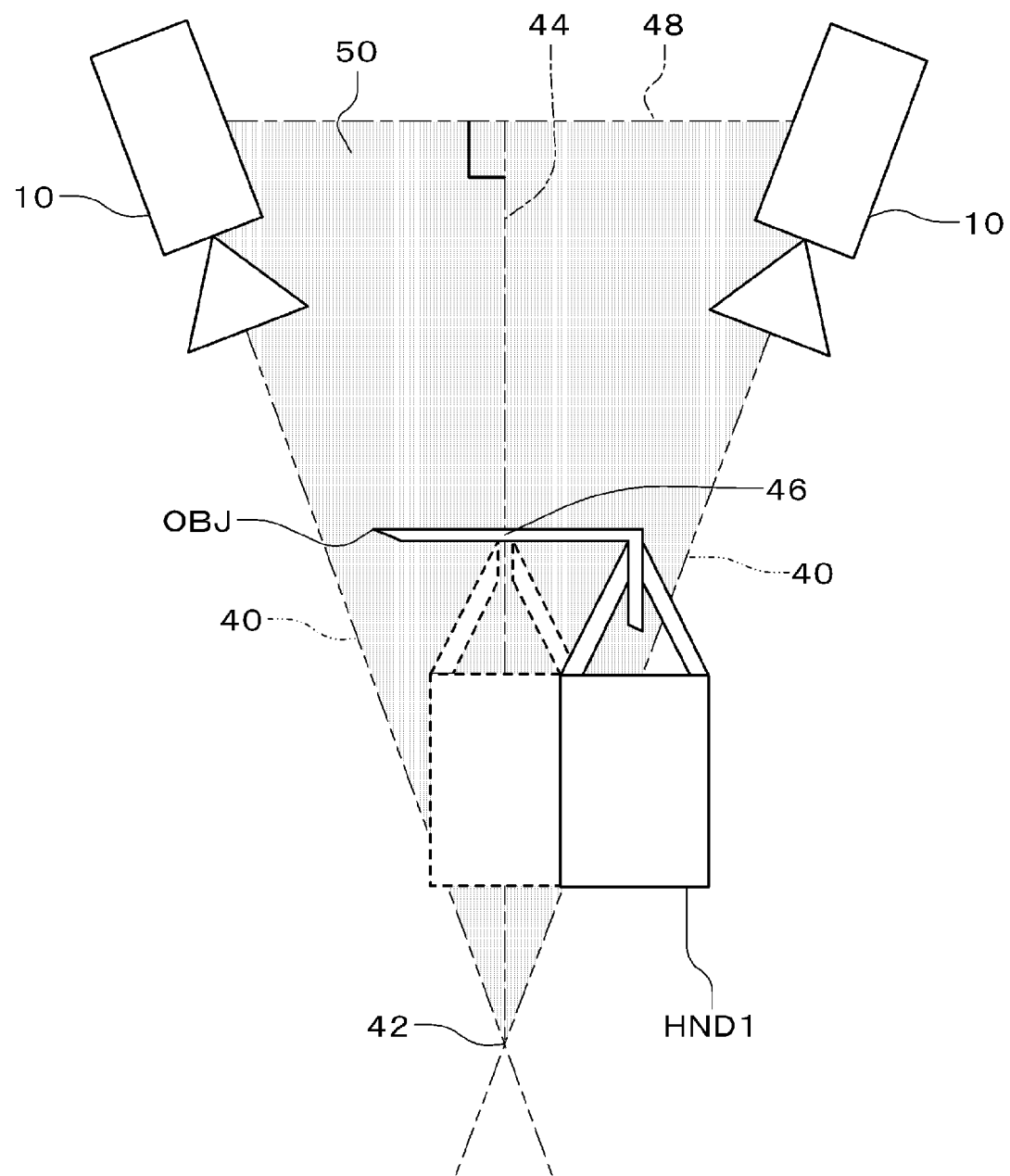
FIG. 11 is a diagram showing a movement position of a hand according to a second embodiment.

The movement section causes an outline shape of the object OBJ to move to a position so as to be imaged by the camera 10, in a state where the object OBJ is grasped (see FIG. 11).

Figure 10B:
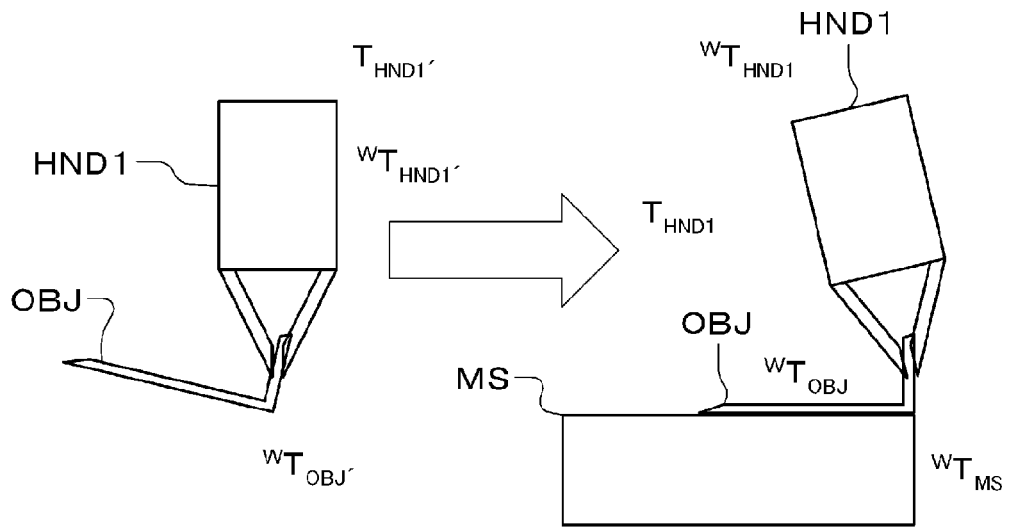

The correction section corrects the target position of the hand HND1 so that the object OBJ has the position and the posture to be assembled on an assembly surface MS (see FIG. 10B).

The assembly section assembles the object OBJ to the assembly surface MS (see FIG. 10B).

The robot control unit 16 includes a first control unit, a second control unit, a third control unit, and a fourth control unit.

The first control unit calculates position and posture information (first imaging information) using an image of the hand HND1 not grasping the object OBJ which is imaged by the camera 10 at a check position (first point) set on a movement path of the hand HND1.

The second control unit calculates position and posture information (second imaging information) using an image of the hand HND1 not grasping the object OBJ which is imaged by the camera 10 at a target position (second point) set at a position different from the check position on the movement path.

The third control unit calculates position and posture information (third imaging information) using an image of the object OBJ grasped by the hand HND1 which is imaged by the camera 10 at the check position.

The fourth control unit compares each position and posture information item with each previously set expected value and calculates each correction amount for correcting the deviation amount according to the results of the comparison. According to this, since each position and posture information item is corrected regarding the check position and the target position, it is possible to decrease deviation at the time of assembly. The database of the correction amounts may be acquired from the movement path (operation range) of the hand HND1. According to this, the error is decreased, and it is possible to perform the assembly with the grasping error, even after grasping the object OBJ.

FIG. 4 is a diagram illustrating an example of a grasping method of the object OBJ with the hand HND1 according to the embodiment. The upper part of the diagram of FIG. 4 is a cross-sectional view of a positional relationship between the hand HND1 and the object OBJ installed on the installation surface M, when the installation M is viewed from the right side. The lower part of the diagram of FIG. 4 is a diagram of a positional relationship between the hand HND1 and the object OBJ installed on the installation surface M, when the installation M is seen from the top (for example, side of the surface where the object OBJ is installed). As long as the installation surface M is the surface where the object OBJ is installed, the installation surface is not necessarily a surface orthogonal to a vertical direction like a table surface, and may be a wall surface, for example.

As shown in FIG. 4, the hand HND1 includes the plurality of claw portions 52 each including a distal portion 54 which is disposed in a first direction (x) and a second direction (y) and grasps the object OBJ, and a proximal portion 56 which is positioned in a third direction (z) orthogonal to the first direction (x) and the second direction (y) with respect to the distal portion 54.

Herein, the grasping method of the object OBJ by the hand HND1 will be described with reference to FIG. 4.

First, the robot control unit 16 moves the hand HND1 of the robot 2 to the position on the installation surface M shown in the lower side drawing of FIG. 4, based on the three-dimensional position and posture of the object OBJ. Herein, a coordinate axis of the upper and lower side drawings of FIG. 4 is a coordinate axis for showing the positional relationship between the installation surface M and the object OBJ and is not a robot coordinate system or a coordinate axis on the captured image. In a case where the object OBJ is installed on the installation surface M, the position of the hand HND1 shown in the lower side drawing of FIG. 4 is the top of the object OBJ. The robot control unit 16 moves the object OBJ to the place so as to be grasped by the hand HND1, by moving the hand HND1 in the direction (z direction) shown with an arrow in the upper side drawing of FIG. 4.

The robot control unit 16 controls the robot 2 so that the robot performs a predetermined operation, after the hand HND1 grasps the object OBJ.

Preprocess

Figure 5:
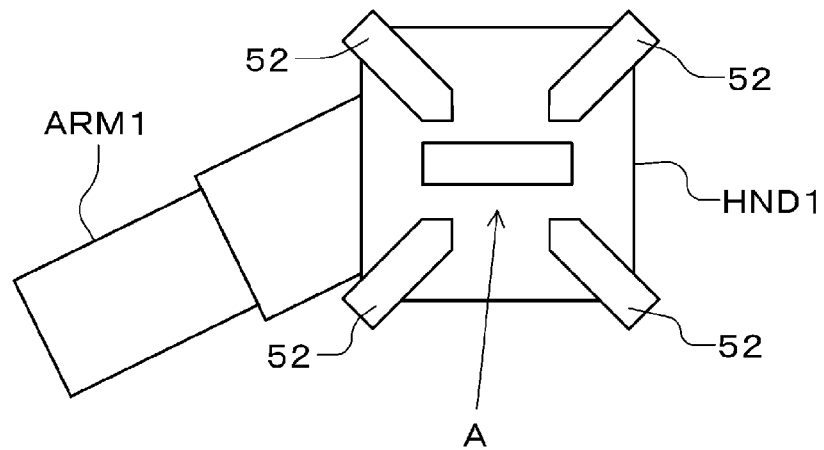
FIG. 5 is a diagram showing a hand at a check position according to the first embodiment.
Figure 6:
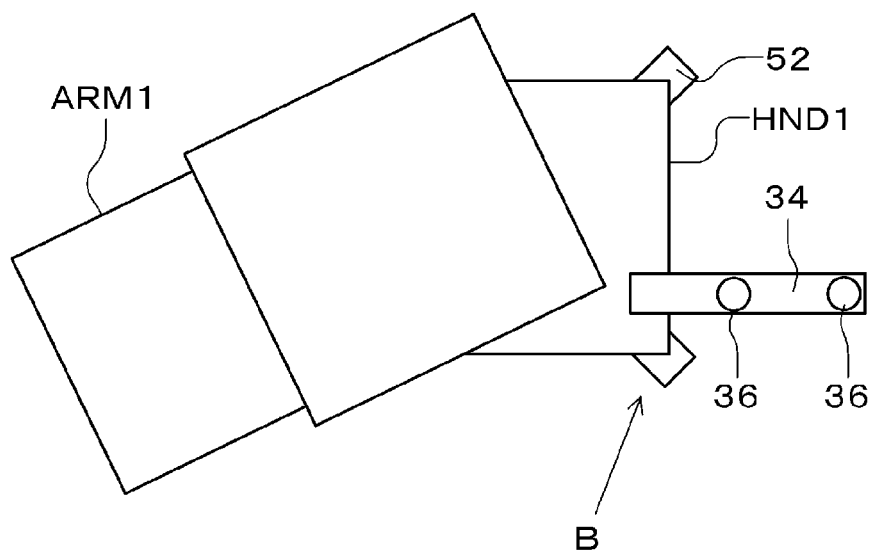
FIG. 6 is a diagram showing a hand at a target position according to the first embodiment.

FIG. 5 is a diagram showing the hand HND1 at the check position according to the embodiment. FIG. 6 is a diagram showing the hand HND1 at the target position according to the embodiment.

First, the hand HND1 is moved to the check position for checking the object OBJ to be grasped in a state where the object OBJ is not grasped, and the position and the posture information (first imaging information) of the hand HND1 is acquired. Accordingly, it is possible to acquire the position and the posture information of the hand HND1 at the position for checking the object OBJ to be grasped. The position and the posture information is, for example, three-dimensional position and posture information. As shown in FIG. 5, in the checking of the position and the posture information of the hand HND1, a position and a posture of a palm of the hand HND1 is acquired. In the checking of the position and the posture information of the hand HND1, a portion shown with an arrow A of FIG. 5 may be detected. The position to which the hand HND1 is moved, may be on a linear line obtained by connecting an intersection of optical axes of the cameras 10 and a base line between the cameras 10. It is possible to understand a relationship between the position and the posture information of the hand HND1 acquired with direct kinematics and position and posture information of the hand HND1 in the camera coordinate system.

Next, the hand HND1 is moved to the target position around the assembly surface MS and the position and the posture information (second imaging information) of the hand HND1 is acquired. In the checking of the position and the posture information of the hand HND1, a part shown with an arrow B of FIG. 6 may be measured. At a position for performing the assembly, it is difficult to observe the hand HND1 from the stereo camera on the head portion, due to shielding of the arm, in some cases. Accordingly, as shown in FIG. 6, a jig is used so that a part of a jig 34 can be observed from the camera 10. For example, a marker 36 is attached to a part of the jig 34, and the marker 36 is measured by the camera 10. In this case, a linear line from the two markers 36 of the jig 34 is calculated. The jig 34 is held in two directions and an intersection of two linear lines is acquired, and accordingly, this is set as the position of the hand HND1. Since the surface is configured with two linear lines, the direction of this surface can be set as a direction of the palm of the hand HND1. In the same manner as described above, it is possible to understand a relationship between the position and the posture information of the hand HND1 acquired with direct kinematics and position and posture information of the hand HND1 in the camera coordinate system. According to this, it is possible to easily calculate the position and the posture information of the hand HND1.

At the Time of Actual Action

Figure 7:
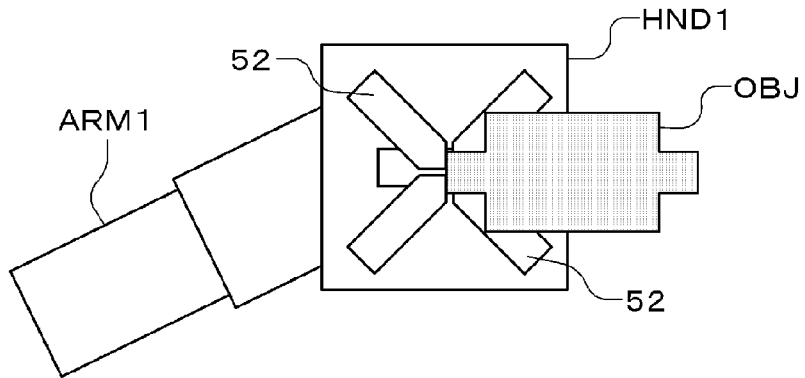
FIG. 7 is a diagram showing a hand at a check position according to the first embodiment.

FIG. 7 is a diagram showing the hand HND1 at the check position according to the embodiment.

In a state where the object OBJ is grasped, the hand HND1 is moved to the check position for checking the object OBJ, and the position and the posture information (third imaging information) of the grasped object OBJ is acquired. Accordingly, it is possible to acquire a relationship between the position and the posture information of the hand HND1 and the position and the posture information of the grasped object OBJ, in the camera coordinate system. As shown in FIG. 7, in the checking of the position and the posture information of the hand HND1, a position and a posture of a palm of the hand HND1 is acquired.

The correction of the position and the posture information is performed using the relationship with the position and the posture information of the hand HND1 acquired with direct kinematics which is acquired in advance preparation. It is assumed that there is a repeat accuracy of the robot.

Next, a tip of the hand HND1 is moved to the target position. The movement amount is set by considering the correction amount. The moved tip has the position and the posture obtained by considering the correction amount calculated in the advance preparation.

Regarding the posture of the hand HND1 imaged by the camera 10 at the check position, the camera 10 is preferably positioned of the claw portion 52 in the third direction (z) on the distal portion 54 side. According to this, it is possible to display a rear surface (surface not overlapping the hand HND1 or the claw portion 52) of the object OBJ in the imaging direction of the camera 10. Accordingly, there is no shielding between the camera 10 and the object OBJ and the object OBJ is rarely screened by the hand HND1. As a result, it is possible to image the outline shape of the rear side of the object OBJ.

EXAMPLE

As an example, an operation of assembling a screw fastening plate to a screw fastening base is used.

Figure 8:
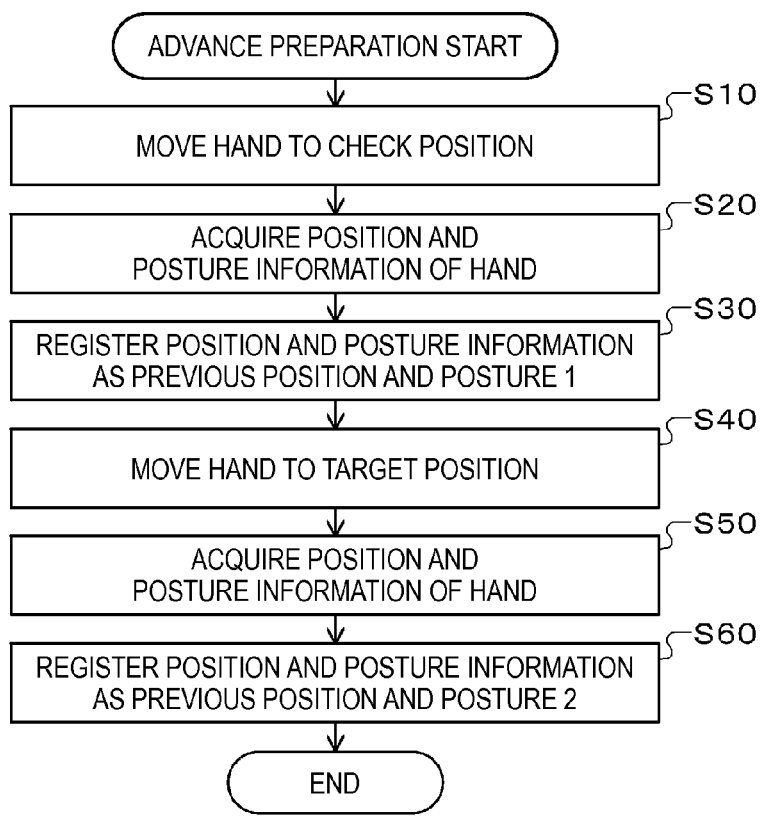
FIG. 8 is a flowchart showing an example of a flow of a preprocess executed by a robot control unit of the robot according to the first embodiment.
Figure 9:
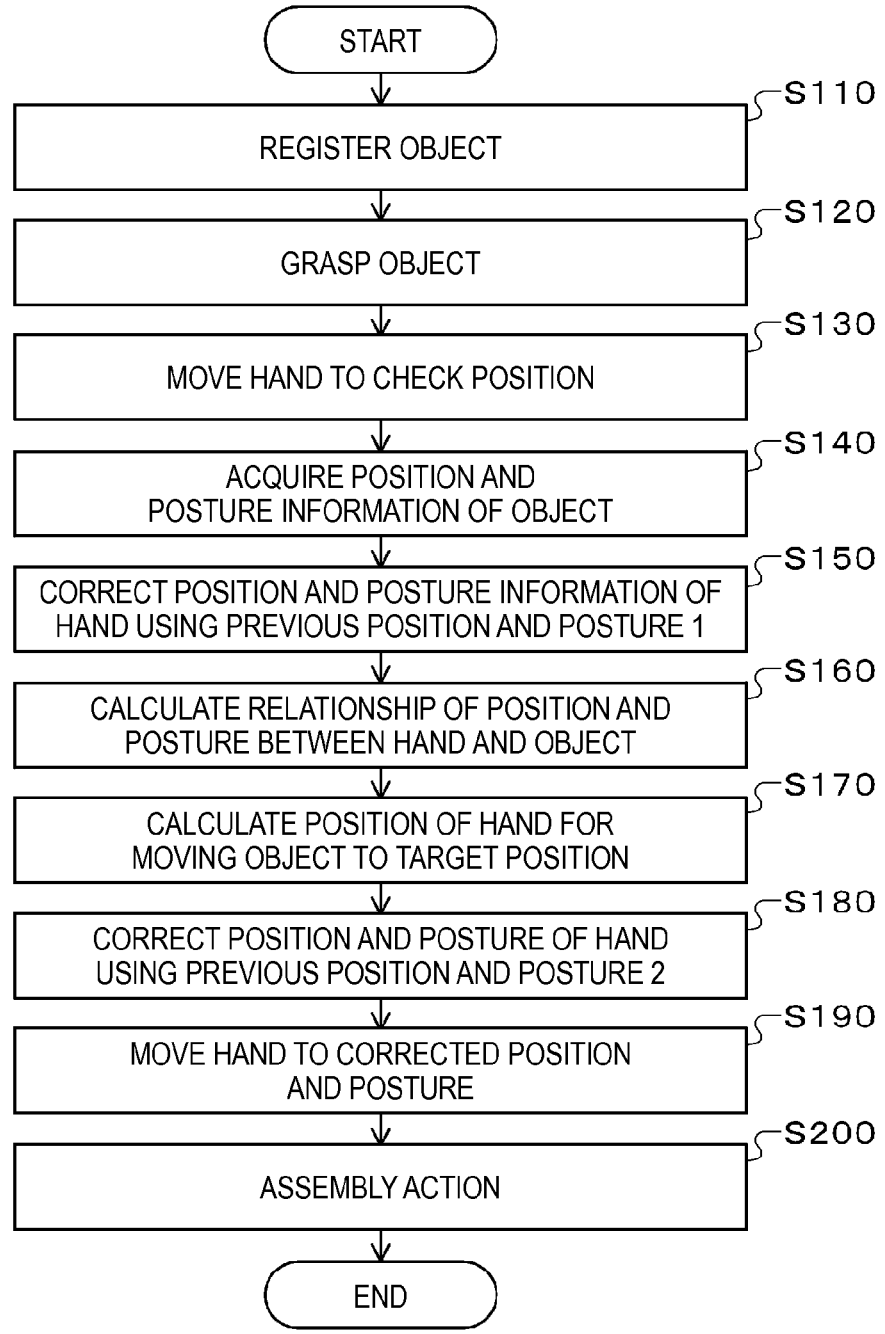
FIG. 9 is a flowchart showing an example of a flow of an assembly process executed by the robot control unit of the robot according to the first embodiment.

FIG. 8 is a flowchart showing an example of a flow of a preprocess executed by the robot control unit of the robot according to the embodiment. FIG. 9 is a flowchart showing an example of a flow of an assembly process executed by the robot control unit of the robot according to the embodiment. FIGS. 10A and 10B are diagrams showing the position and the postures of the hand HND1 according to the embodiment. FIG. 10A is a diagram showing the target position of the hand HND1 and FIG. 10B is a diagram showing correction of the position and the posture of the hand HND1. The object OBJ is a screw fastening plate and the assembly surface MS is an assembly surface of a screw fastening base. W is a world coordinate and T denotes coordinate conversion.

Hereinafter, a process performed by the robot control unit 16 when the robot 2 assembles the object OBJ to the assembly surface MS will be described with reference to FIG. 8. Hereinafter, the hand HND1 of the robot 2 will be described with the assumption that the hand is moved to the immediately above the object OBJ by the robot control unit 16.

First, as shown in FIG. 8, in Step S10, the hand HND1 is moved to the check position for checking the object OBJ to be grasped.

In Step S20, the position and the posture information (first imaging information) of the check position (first point) of the hand HND1 is acquired. FIG. 10B shows this operation as $^{W}T_{HND1'}$. According to this, since the first imaging information is the position and the posture information, it is possible to easily check the position and the posture of the hand HND1.

In Step S30, the position and the posture information of the check position of the hand HND1 is registered as a previous position and posture 1.

In Step S40, the hand HND1 is moved to the vicinity of the target position for assembling the grasped object OBJ.

In Step S50, the position and the posture information (second imaging information) of the target position (second point) of the hand HND1 is acquired. FIG. 10B shows this operation as $^{W}T_{HND1}$. According to this, since the second imaging information is the position and the posture information, it is possible to easily check the position and the posture of the hand HND1.

In Step S60, position and posture information of the target position of the hand HND1 is registered as a previous position and posture 2.

Hereinafter, the process performed by the robot control unit 16 when the robot 2 assembles the object OBJ to the assembly surface MS will be described with reference to FIG. 9. Hereinafter, the hand HND1 of the robot 2 will be described with the assumption that the hand is moved to the immediately above the object OBJ by the robot control unit 16.

First, as shown in FIG. 9, in Step S110, the object OBJ is registered. Specifically, the position and the posture of the object OBJ with respect to the assembly surface MS is designated. FIG. 10B shows this operation as $^{MS}T_{OBJ}$. The position and the posture of the assembly surface MS in world coordinates W is designated. FIG. 10B shows this operation as $^{W}T_{MS}$. The position and the posture of the object OBJ in world coordinates W is calculated. For example, this operation can be expressed as $^{W}T_{OBJ} = {}^{W}T_{MS}{}^{MS}T_{OBJ}$. The position and the posture information of the check position of the object OBJ is acquired. For example, FIG. 10B shows this operation as $^{W}T_{OBJ'}$.

In Step S120, the object OBJ is grasped.

In Step S130, the hand HND1 is moved to the check position for checking the grasped object OBJ.

In Step S140, the position and the posture information (third imaging information) of the grasped object OBJ is acquired. According to this, since the third imaging information is the position and the posture information, it is possible to easily check the position and the posture of the object OBJ.

In Step S150, the position and the posture of the hand HND1 is corrected using the previous position and posture 1 of the hand HND1. The correction amount of the check position of the hand HND1 is calculated using the previous position and posture 1 of the hand HND1. FIG. 10B shows this operation as $T_{HND1'}$. The check position of the hand HND1 is corrected. For example, this operation can be expressed as $T_{HND1'}{}^{W}T_{HND1''}$.

In Step S160, a relationship between the position and the posture of the hand HND1 and the position and the posture of the grasped object OBJ is calculated.

In Step S170, the position of the hand HND1 from which the grasped object OBJ is moved to the target position is calculated. The conversion amount for moving the object OBJ to the target position is calculated. For example, this operation can be expressed as $^{W}T_{OBJ'} = T \cdot {}^{W}T_{OBJ}$ and $T = {}^{W}T_{OBJ'}{}^{W}T_{OBJ}^{-1}$. The target position of the hand HND1 is calculated. For example, this operation can be expressed as $^{W}T_{HND1} = TT_{HND1'}{}^{W}T_{HND1''}$.

In Step S180, the position and the posture of the hand HND1 is corrected using the previous position and posture 2 of the hand HND1. The correction amount of the target position of the hand HND1 is calculated using the previous position and posture 2 of the hand HND1. FIG. 10B shows this operation as $T_{HND1}$. The target position of the hand HND1 is corrected. For example, this operation can be expressed as $T_{HND1}{}^{W}T_{HND1}$.

In Step S190, the hand HND1 is moved to the corrected target position.

In Step S200, the assembly operation is performed. According to this, it is possible to move the screw fastening plate as close as possible to the desired position.

As described above, since the robot 2 of the embodiment calculates the relationship between the hand HND1 and the object OBJ grasped by the hand HND1 based on each position and posture information item regarding the check position and the target position, it is possible to decrease deviation at the time of assembly. Therefore, it is possible to provide the robot 2, the control method of the robot 2, and the control device 12 of the robot 2 which realize assembly with high accuracy.

Second Embodiment

The embodiment is different from that of the first embodiment in a point that the robot 2 of the embodiment performs the imaging by temporarily changing the position and the posture of the grasped object OBJ to be in an imaging area of the camera 10. Hereinafter, the same reference numerals are used for the same configuration members as those of the first embodiment, and therefore the description thereof will be omitted or simplified herein.

FIG. 11 is a diagram showing a movement position of the hand HND1 according to the embodiment.

The plurality of cameras 10 may be configured with two cameras 10. The object OBJ grasped by the hand HND1 may be on a vertical line 44 drawn from an intersection 42 of optical axes 40 of the two cameras 10 to a linear line 48 connecting the positions of the two cameras 10.

In addition, the center of gravity 46 of the object OBJ grasped by the hand HND1 may be on the vertical line 44 drawn from the intersection 42 of the optical axes 40 of the two cameras 10 to the linear line 48 connecting the positions of the two cameras 10.

An opening and closing direction of the claw portion 52 of the hand HND1 grasping the object OBJ may be a normal line direction of a plane 50 including the intersection 42 of the optical axes 40 of the two cameras 10 and the position of the two cameras 10. According to this, there is no shielding between the cameras 10 and the object OBJ, and the object OBJ is rarely screened by the hand HND1.

Hereinafter, a process performed by the robot control unit 16 when the robot 2 assembles the object OBJ to the assembly surface MS will be described with reference to FIG. 12.

Figure 12:
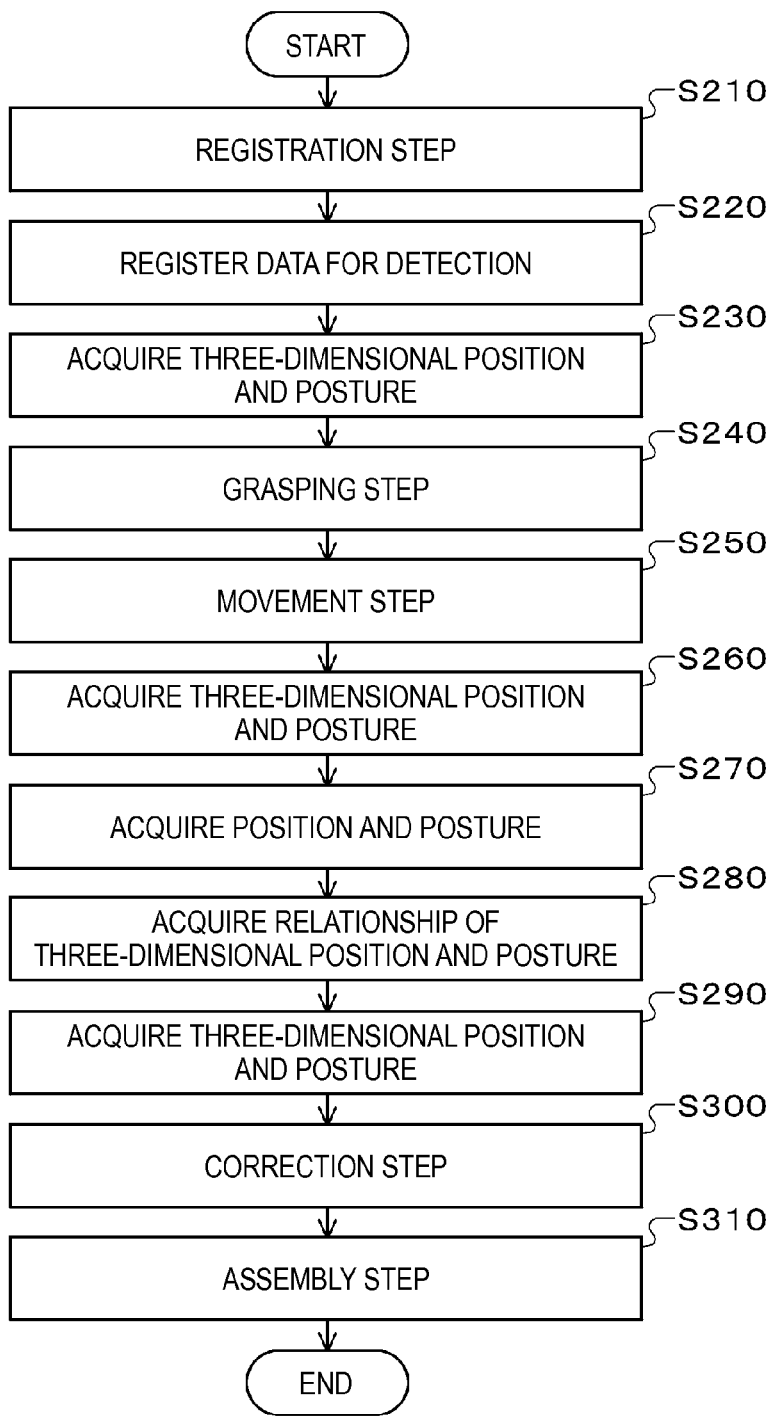
FIG. 12 is a flowchart showing an example of a flow of an assembly process executed by a robot control unit of a robot according to the second embodiment.

FIG. 12 is a flowchart showing an example of a flow of the assembly process executed by the robot control unit 16 of the robot 2 according to the embodiment.

First, as shown in FIG. 12, in step 210, the target position of the hand HND1 is registered in the storage unit 22 as shown in FIG. 10A, so that the object OBJ has the position and the posture to be assembled to the assembly surface MS, as a registration step.

In Step S220, data for detecting the object OBJ and the installation surface M is registered in the storage unit 22. Alternatively, the three-dimensional position and posture of the object OBJ with respect to the installation surface M is registered in the storage unit 22.

In Step S230, the three-dimensional position and posture of the installation surface M and the object OBJ is acquired from the storage unit 22.

In Step S240, the object OBJ is grasped using the hand HND1 as a grasping step. The position and the posture where the grasped object OBJ can be observed by the cameras 10 is calculated.

In Step S250, the object OBJ is moved to the position so as to be imaged by the camera 10, in a state where the object OBJ is grasped, as a movement step. The grasped object OBJ is moved to in front of the cameras 10 and the three-dimensional position and posture of the grasped object OBJ is detected.

In Step S260, the three-dimensional position and posture of the object OBJ is acquired by the cameras 10.

In Step S270, the position and the posture of the hand HND 1 grasping the object OBJ is acquired from the storage unit 22.

In Step S280, a relationship (deviation from a set value) of the three-dimensional position and posture between the object OBJ and the hand HND1 is acquired.

In Step S290, the three-dimensional position and posture of the assembly surface MS is acquired from the storage unit 22.

In Step S300, the target position of the hand HND1 is corrected so that the object OBJ has the position and the posture to be assembled to the assembly surface MS, as a correction step. The target position of the hand HND1 with the corrected deviation from the set value is calculated. The position and the posture of the hand HND1 is changed so that the grasped object OBJ is at the target position.

In Step S310, the object OBJ is assembled to the assembly surface MS as an assembly step. By performing the correction of the position and the posture of the hand HND1 regarding the inclination (deviation) of the object OBJ with respect to the hand HND1, it is possible to have minimum inclination of the object OBJ with respect to the assembly surface MS, when performing the assembly, as shown in FIG. 10B. The process then ends.

As described above, the robot 2 according to the embodiment performs the imaging by temporarily changing the position and the posture of the grasped object OBJ to be in the imaging area of the camera 10. Accordingly, it is possible to perform the imaging in a state where the amount of the object OBJ shielded by the hand HND1 of the robot 2 is decreased as much as possible, at the time of the imaging. It is possible to ascertain the positional relationship between the object OBJ and the hand HND1 by converting the camera coordinates of the object OBJ to the world coordinate. As a result, it is possible to perform the assembly with little errors by correcting the position deviation between the object OBJ and the hand HND1 in a state where the robot 2 grasps the object OBJ.

When the relationship in position and postures between the hand HND1 and the camera 10 or the direction of the line of sight of the camera 10 is already known, the object OBJ may be moved so as to be in the sight of the camera 10, in order to check the state of the object OBJ grasped by the robot. At that time, it is desirable that there is as little shielding as possible between the camera 10 and the object OBJ, and the object OBJ is rarely screened by the hand HND1.

By comparing the relationship between the detected position and posture of the object OBJ and the position and the posture of the hand HND1, it is possible to detect whether or not this relationship has deviated from the expected relationship registered in the database.

Since the imaging unit is set to be movable by rotating the head and body, it is possible to image the target without taking an unusual posture, and it is possible to accurately acquire the position and the posture of the target.

The embodiments are not limited to the above descriptions, and the following embodiments can be used.

In the embodiments described above, the opening and closing direction of the claw portion 52 of the hand HND1 is not limited to coincide with the normal line of the plane 50 including the intersection 42 of the optical axes 40 of the imaging unit 10 and the positions of the two cameras 10, and an angle formed by the two may be approximately 90 degrees depending on the grasped state, for example.

Since the shape of the object OBJ to be detected is already known, the relationship (deviation from a set value) in the three-dimensional position and posture between the object OBJ and the hand HND1 may be acquired from the image of a part of the object OBJ.

Since the optical axes 40 rarely intersect with each other, the intersection 42 of the optical axes 40 of the cameras 10 may be calculated by a midpoint method or the like.

By performing the operation in combination with a visual servo, an operation start position of the visual servo is stable, and accordingly, it is possible to expect assembly with a high accuracy.

Hereinabove, the robot 2, the control method of the robot 2, and the control device 12 of the robot 2 have been described based on the embodiments shown in the drawings, but the invention is not limited thereto, and the configuration of each unit can be replaced with an arbitrary configuration having the same function. In addition, other arbitrary constituent elements may be added to the invention.

The entire disclosure of Japanese Patent Application No. 2014-113819, filed Jun. 2, 2014 and 2015-034917, filed Feb. 25, 2015 are expressly incorporated by reference herein.

What is claimed is:

1. A robot comprising:
 a hand that is configured to grasp an object;
 a camera that is configured to take first, second, and third actual images of the hand, the camera being configured to output first, second, and third actual image data corresponding to the first, second, and third images, the camera being configured to:
  take the first actual image of the hand without grasping the object when the hand is located at a first actual position;
  take the second actual image of the hand without grasping the object when the hand is located at a second actual position that is different from the first position; and
  take the second actual image of the hand while grasping the object when the hand is located at the first actual position;
 a memory that stores:
  first ideal image data corresponding to a first state in which the hand without grasping the object is located at a first ideal position;
  second ideal image data corresponding to a second state in which the hand without grasping the object is located at a second ideal position; and
  third ideal image data corresponding to a third state in which the hand while grasping the object is located at the first position; and
 a processor that is configured to:
  correct a position of the hand by comparing the first actual image data with the first ideal data when the hand while grasping the object is located at the first actual position so as to move the hand to a first corrected position, and correct a relative location of the hand and the object by comparing the third actual image data with the third ideal image data;
  move the hand from the first corrected position to the second position; and
  correct a position of the hand by comparing the second actual image data with the second ideal image data when the hand while grasping the object is located at the second actual position so as to move the hand to a second corrected position.

2. The robot according to claim 1,
 wherein the first and second actual image data correspond to position and posture information of the hand, and
 the third actual image data and the first, second, and third ideal image data correspond to position and posture of the hand and object.

3. The robot according to claim 1,
 wherein the hand includes a plurality of claws which extend from a base of the hand, each of the plurality of claws including a distal portion which grasps the object, and each of the plurality of claws including a proximal portion which is positioned closer to the base of the hand than the distal portion, and the camera is configured to take the first, second, and third actual images when the distal portion is located closer to the camera than the proximal portion.

4. The robot according to claim 3, wherein a plurality of the cameras are provided.

5. The robot according to claim 3, wherein the camera is a stereo camera.

6. The robot according to claim 1, wherein the second actual image includes a marker provided on the hand.

7. A control method of a robot, the robot includes:

a hand that is configured to grasp an object;

a camera that is configured to take first, second, and third actual images of the hand, the camera being configured to output first, second, and third actual image data corresponding to the first, second, and third images, the camera being configured to:

take the first actual images of the hand without grasping the object when the hand is located at a first actual position;

take the second actual image of the hand without grasping the object when the hand is located at a second actual position that is different from the first position; and take the second actual image of the hand while grasping the object when the hand is located at the first actual position;

a memory that stores:

first ideal image data corresponding to a first state in which the hand without grasping the object is located at a first ideal position;

second ideal image data corresponding to a second state in which the hand without grasping the object is located at a second ideal position; and third ideal image data corresponding to a third state in which the hand while grasping the object is located at the first position; and a processor, the control method comprising:

correcting a position of the hand by comparing the first actual image data with the first ideal image data by the processor when the hand while grasping the object is located at the first actual position so as to move the hand to a first corrected position by the processor, and correcting a relative location of the hand and the object by comparing the third actual image data with the third ideal image data by the processor;

moving the hand from the first corrected position to the second position by the processor; and correcting a position of the hand by comparing the second actual image data with the second ideal image data by the processor when the hand while grasping the object is located at the second actual position so as to move the hand to a second corrected position by the processor.

8. A control device of a robot which controls the robot, the robot includes:

a hand that is configured to grasp an object; and a camera that is configured to take first, second, and third actual images of the hand, the camera being configured to output first, second, and third actual image data corresponding to the first, second, and third images, the camera being configured to:

take the first actual image of the hand without grasping the object when the hand is located at a first actual position;

take the second actual image of the hand without grasping the object when the hand is located at a second actual position that is different from the first position; and take the second actual image of the hand while grasping the object when the hand is located at the first actual position, the control device comprising:

a memory that stores:

first ideal image data corresponding to a first state in which the hand without grasping the object is located at a first ideal position;

second ideal image data corresponding to a second state in which the hand without grasping the object is located at a second ideal position; and third ideal image data corresponding to a third state in which the hand while grasping the object is located at the first position; and a processor, the control method comprising:

correcting a position of the hand by comparing the first actual image data with the first ideal image data by the processor when the hand while grasping the object is located at the first actual position so as to move the hand to a first corrected position by the processor, and correcting a relative location of the hand and the object by comparing the third actual image data with the third ideal image data by the processor;

moving the hand from the first corrected position to the second position by the processor; and correcting a position of the hand by comparing the second actual image data with the second ideal image data by the processor when the hand while grasping the object is located at the second actual position so as to move the hand to a second corrected position by the processor.

\* \* \* \* \*